United States Patent
Kirkpatrick et al.

(10) Patent No.: US 7,080,351 B1
(45) Date of Patent: Jul. 18, 2006

(54) SYSTEM AND METHOD FOR PERFORMING RAPID APPLICATION LIFE CYCLE QUALITY ASSURANCE

(75) Inventors: Mark A. Kirkpatrick, Conyers, GA (US); Darin J. Morrow, Acworth, GA (US); Nichole Anderson, Duluth, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 605 days.

(21) Appl. No.: 10/114,953

(22) Filed: Apr. 4, 2002

(51) Int. Cl.
*G06F 9/44* (2006.01)

(52) U.S. Cl. ..................... 717/102; 717/123
(58) Field of Classification Search ........ 717/101–103, 717/120–123; 715/7–9, 500
See application file for complete search history.

(56) References Cited

U.S. PATENT DOCUMENTS 6,256,773 B1 * 7/2001 Bowman-Amuah ......... 717/121

OTHER PUBLICATIONS

T. C. Chiang, "Product and Service Testing Methodology and ISO 9000," 1994, IEEE, Proceedings of the IEEE International Conference on Industrial Technology, pp. 852-855.*

Martin Verlage and Jürgen Münch, "Formalizing Software Engineering Standards," 1997, IEEE, Proceedings of the Third International Symposium and Forum on Software Engineering Standards (ISESS'97), pp. 196-206.*

* cited by examiner

*Primary Examiner*—Tuan Dam
*Assistant Examiner*—Eric B. Kiss
(74) *Attorney, Agent, or Firm*—Withers & Keys, LLC

(57) ABSTRACT

Performance of quality assurance for a computer application development proceeds in a series of phases. Each of the phases in the QA life cycle corresponds to one or more phases in a computer application development life cycle. For example, in one embodiment, the quality assurance life cycle includes four phases—a test strategy phase, a test planning phase, a test execution phase and a rollout phase. Each phase of the QA life cycle has entrance and exit criteria. The phase can be entered when the entrance criteria have been met. When the exit criteria are met, the phase causes a gate to be closed to allow the software development life cycle to proceed to the next phase. In one embodiment, the software life cycle includes six phases—a requirements phase, a design phase, a code/unit test phase, a system test phase, a pre-production test phase and a production test phase.

1 Claim, 4 Drawing Sheets

SYSTEM AND METHOD FOR PERFORMING RAPID APPLICATION LIFE CYCLE QUALITY ASSURANCE

BACKGROUND

1. Field of the Invention

The present invention relates generally to project management of computer software development. More specifically, the present invention relates to an efficient procedure for managing quality assurance in a rapid manner required for web-based development applications.

2. Background of the Invention

Traditional software development attempts to provide software that meets customers' requirements. These requirements are often general in nature and are generated from information gathered by groups of project managers or project architects from groups of customers, often through third persons. A problem with such general requirements is that they do not accurately reflect each individual customer's needs. As a result, when a software application meeting the general requirements is delivered and installed, it often does not fully satisfy a particular customer's requirements.

As a result, customers often request changes to the software application, reject the software application delivery or take some other adverse action. In response to the customer's comments and actions, the software development and installation process must be repeated to meet new requirements. This iterative nature of traditional software development makes conventional software development time-consuming and costly.

In web-based software development efforts, the foregoing problems associated with delivery of software applications that do not adhere to customer requirements are or do not meet customer expectations magnified. This is because there are usually many more customers of the software, they are likely to be more diverse and to have had less input into the initial design of the software. Consequently, the initial requirements gathering is even less accurate than with traditional software development. Thus, designers and developers are often inundated with numerous change requests for modification to the software to meet specific customer requirements.

These changes require testing to assure that they are correctly implemented in delivered software. Testing results are conventionally analyzed by quality assurance personnel. However, inefficiencies in conventional quality assurance processes increase overall project costs and negatively impact time to market. Consequently, a streamlined quality assurance process that will enhance software reliability, while decreasing cost and schedule is required.

SUMMARY OF THE INVENTION

The present invention addresses the foregoing problems in the art by providing a system and method for managing quality assurance through the life cycle of a change made to a deployed application. In one embodiment, the present invention is a structured procedure comprising four phases. These phases are a test strategy phase, a test planning phase, a test execution phase and a roll out phase. Each phase has a set of entry requirements to enter the phase, and a set of exit requirements to exit the phase. No phase can be entered into if its entry requirements are not satisfied. Similarly, no phase can be exited if its exit requirements are no satisfied. Preferably, the four test phases correspond to various aspects of a software development life cycle.

In one embodiment, the present invention is a method for performing rapid life cycle quality assurance. The method includes the steps of partitioning a software development life cycle into a plurality of life cycle phases and partitioning a quality assurance life cycle into a plurality of quality assurance phases. After partitioning the software development and quality assurance life cycles into phases, one or more of the software development life cycle phases are assigned to each quality assurance phase. Further, the method includes the steps of determining entrance criteria that must be completed during each software development life cycle phase so that the corresponding quality assurance phase can be entered, and of determining exit criteria for each quality assurance phase that, when satisfied, allow the software development life cycle to proceed to the next phase.

In another embodiment, the present invention is a method for producing computer software using structured life cycle quality assurance. The method includes the steps of defining a plurality of quality assurance phases for a quality assurance life cycle, wherein each of the quality assurance phases corresponds to at least one software development phase in a software development life cycle. Progression through the phases of the software development life cycle requires defining exit criteria for each of the quality assurance phases that, when completed, allow the software development cycle to proceed to a next software development phase. In addition, the method includes the step of defining entrance criteria for each of the quality assurance phases that must be completed by a corresponding software development stage prior to entering into each quality assurance phase. The computer software is produced after each of the software development phases and each of the quality assurance phases have been completed.

In another embodiment, the present invention is a system for performing rapid life cycle quality assurance. The system includes a quality assurance life cycle having a plurality of quality assurance phases, wherein each quality assurance phase is entered upon satisfaction of particular entrance criteria and a software development life cycle having a plurality of software development phases, wherein each software development phase corresponds to one or more of the quality assurance life cycle phases. Furthermore, the system includes a plurality of gates, wherein each gate can couple a particular software development phase to a next software development phase when particular exit criteria are met, wherein initially the gates are in open state to prevent coupling of the software development phase to the next software development phase.

In another embodiment, the present invention is a system for producing computer software using rapid life cycle quality assurance. The system includes a software application development life cycle that comprises a plurality of development phases. The software development life cycle proceeds from one phase to a next phase only if a gate coupling the one phase and the next phase is closed. In addition, at least one development phase generates entrance criteria for entering a quality assurance phase corresponding to the at least one development phase. The system also includes a quality assurance life cycle that comprises a plurality of quality assurance phases. Each of the quality assurance phases corresponds to at least one of the development phases. Further, successful completion of a quality assurance phase causes a gate coupling software development phases to be closed so that the software application development can proceed.

DETAILED DESCRIPTION OF THE INVENTION

Figure 1:
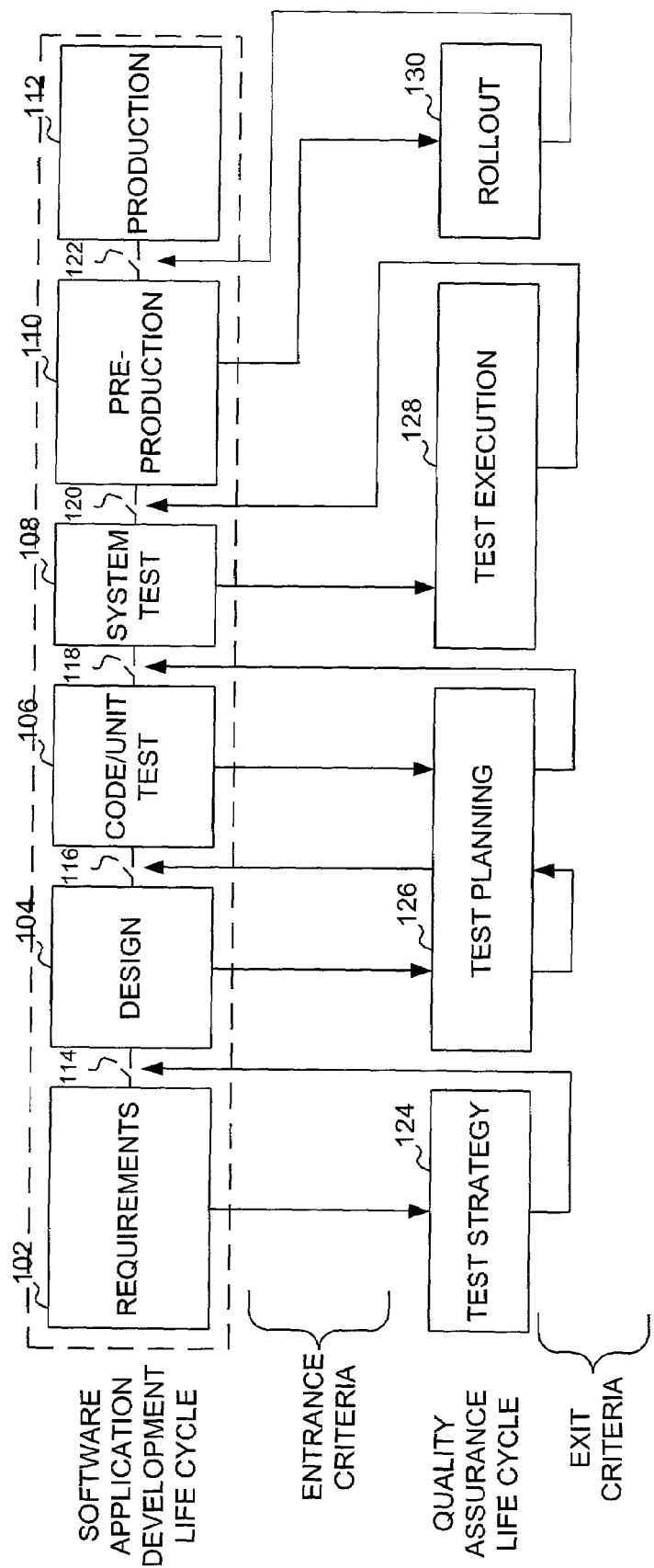
FIG. 1 is a diagrammatic view of the interaction between a software application development life cycle and a quality assurance (QA) life cycle according to an embodiment of the present invention.

FIG. 1 is a diagrammatic view of the interaction between a software application development life cycle and a quality assurance (QA) life cycle according to an embodiment of the present invention. FIG. 1 shows the phases of a typical software application development life cycle. As shown in FIG. 1, a typical software application life cycle proceeds through a requirements phase 102, a design phase 104, a code/unit test phase 106, a system test phase 108, a pre-production phase 110 and a production phase 112. Requirements for the software application are developed in requirements phase 102. Design aspects for the software application are generated in design phase 104. Code and unit test procedures are considered and written in code/unit test phase 106. System testing is performed in system test phase 108 using the testing procedures developed in code/unit test phase 106. Complete end-to-end system testing is performed in pre-production phase 110. Finally, the software is produced in production phase 112.

In one embodiment of the present invention, proceeding through the phases of the software application life cycle is logically controlled by gates. As shown in FIG. 1, a gate 114 controls proceeding from requirements phase 102 to design phase 104. Another gate 116 controls proceeding from design phase 104 to code/unit test phase 106. Another gate 118 controls proceeding from code/unit test phase 106 to system test phase 108. Another gate 120 controls proceeding from system test phase 108 to pre-production phase 110. Another gate 122 controls proceeding from pre-production phase 110 to production phase 112. According to an embodiment of the present invention, a software application development process can proceed from one phase to another phase only if the gate between the two processes is closed.

Initially, gates 114, 116, 118, 120 and 122 are open. Thus, the software development life cycle cannot advance from one phase to the next. Each gate is closed only when certain exit criteria are met. As described below, in one embodiment of the present invention, the exit criteria are satisfied when the activities associated with a particular phase of a quality assurance life cycle are completed.

According to the present invention, a quality assurance (QA) life cycle is developed that corresponds to the above-described software application life cycle. In one embodiment of the present invention, QA life cycle has four phases.

A test strategy phase 124 corresponds to requirements phase 102 of the software application development life cycle. Completion of portions of test strategy phase 124 is a requirement for closing gate 114. A test planning phase 126 corresponds to design phase 104 and code/unit test phase 106 of the software application development life cycle. Completion of aspects of test planning phase 126 is a requirement for closing gates 116 and 118. A test execution phase 128 corresponds to system test phase 108 and pre-production phase 110 of the software application development life cycle. Completion of test execution phase 128 is a requirement for closing gate 120. A rollout phase 130 corresponds to production phase 112 of the software application development life cycle. Completion of rollout QA activities is required to close gate 122 to put the software development effort in production.

Entering a particular phase of the QA life cycle requires that certain entrance criteria be met. These entrance criteria are preferably met by performing the necessary actions to complete a particular phase of the software application development life cycle. Thus, the present invention integrates activities associated with a software life cycle and activities associated with a quality assurance life cycle to provide a structured development environment not present in conventional software development environments.

In operation, certain entrance criteria must be met for the process to enter test strategy phase 124. That is, certain information is required to develop a testing strategy for the software development. This information is provided in requirements phase 102. The process enters test strategy phase 124 when these criteria are satisfied by activities performed in requirements phase 102. When the exit criteria for test strategy phase 124 have been satisfied, gate 114 is closed and the process proceeds from requirements phase 102 to design phase 104.

In an embodiment of the present invention, test planning phase 126 corresponds to two software application development life cycle phases. Consequently, in this embodiment of the present invention, two entrance criteria and two exit criteria must be met in test planning phase 126 to close gates 116 to allow the software application development life cycle to proceed from design phase 104 through code/unit test phase 106 to system test phase 108. When the first entrance criteria are met, the process enters a portion of test planning phase 126 corresponding to design phase 104. The first entrance criteria are met by activities performed in design phase 104. The first exit criteria provide sufficient information to close gate 116. Closure of gate 116 enables the software application development to continue to code/unit test phase 108.

When the second entrance criteria are met, the process enters a portion of test planning phase 126 corresponding to code/unit test phase 106. The second entrance criteria are met by activities performed in code/unit test phase 106. The second exit criteria provide sufficient information to close gate 118. Closure of gate 118 enables the software application development to continue to system test phase 106.

Like test planning phase 126, test execution phase 128 corresponds to two software application development life cycle phases—system test phase 108 and pre-production phase 110. However, in this case, there is only one set of entrance criteria that must be satisfied to enter test execution phase 128, and only one set of exit criteria that must be satisfied to exit test execution phase 128 and close gate 120. The entrance criteria are satisfied when all activities that are required to be performed in system test phase 108 are performed, and all deliverables delivered. At this point, the process enters test execution phase 128. QA testing is performed in test execution phase 128. After all QA testing required to meet the exit criteria of test execution phase 128 is performed, gate 120 is closed. Closure of gate 120 enables the software application development life cycle to continue in pre-production phase 110.

During pre-production phase 110, certain entry criteria for entry into QA life cycle rollout phase 130 are completed. When these entry criteria are completed, the process enters rollout phase 130 of the QA life cycle. During rollout phase, certain QA actions are performed to support production of the software application.

When the required actions to meet the exit criteria of rollout phase 130 are completed, gate 122 is closed. Closure of gate 122 allows the process to continue in production phase 112. The software is produced for use in production phase 112.

Figure 2A:
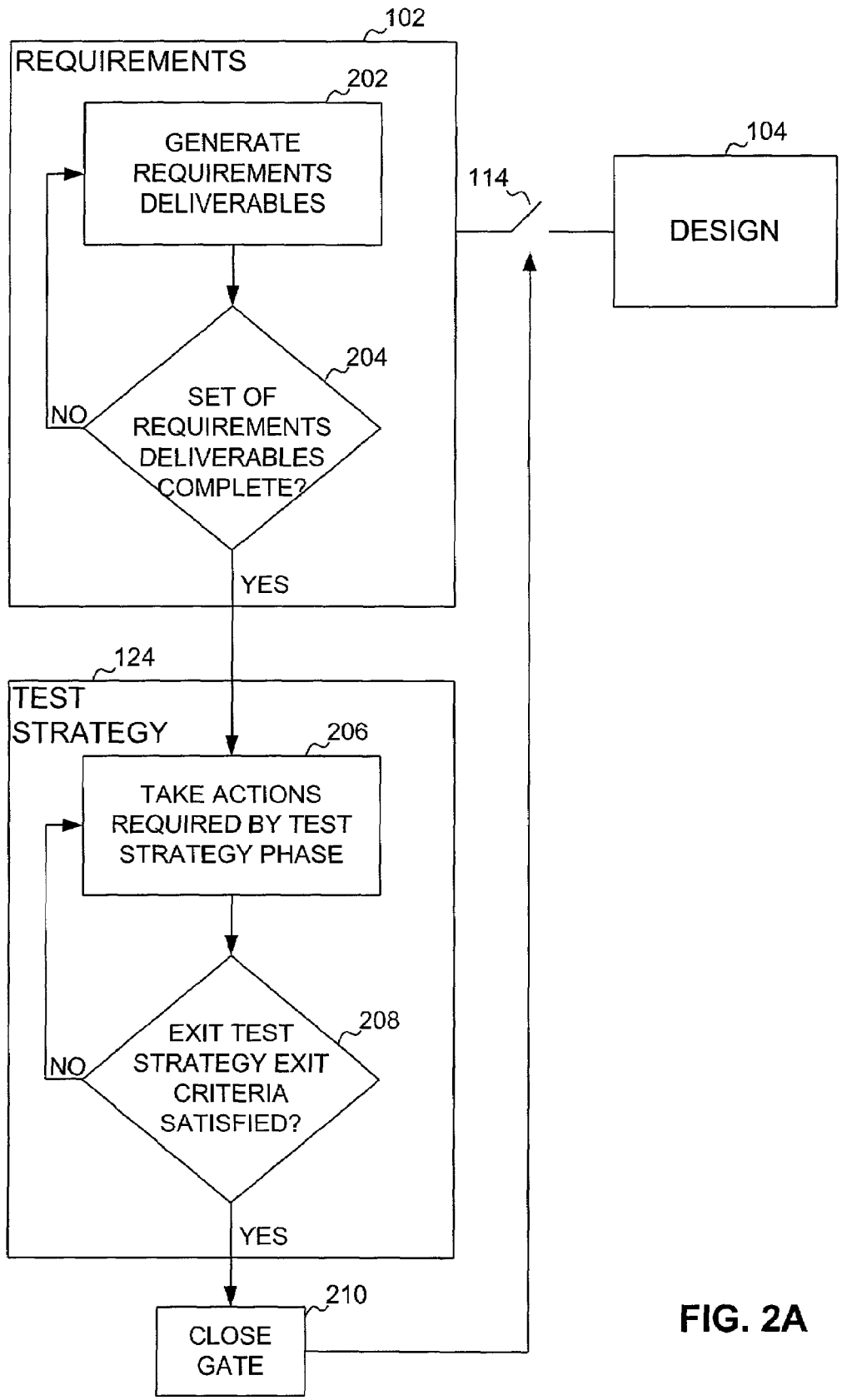
FIG. 2A is a flow chart for a method for generating entrance criteria and satisfying exit criteria to close a gate, permitting a software development life cycle to proceed according to an embodiment of the present invention.

FIG. 2A is a flow chart for a method for satisfying exit criteria for test strategy phase 124 to close gate 114. Closure of gate 114 permits the software development life cycle to proceed from requirements phase 102 to design phase 104 according to an embodiment of the present invention. Steps 202 and 204 are performed during requirements phase 102 to generate entrance criteria for QA life cycle test strategy phase 114. In step 202, requirements deliverables are generated. Step 204 determines whether a complete set of requirements deliverables has been generated. If a complete set of requirements deliverables has not been generated, the method continues in step 202 by continuing to generate required deliverables. If a complete set of requirements deliverables has been generated, the method proceeds in test strategy phase 124.

In one embodiment of the present invention, a complete set of the requirements deliverables for requirements phase 102 includes a high-level requirements document and a high-level design document. The high-level requirements document can include, for example, a list of general requirements that the software being developed must meet. The high-level design document can include a general overview design of a system that meets the general requirements.

In test strategy phase 124, steps 206 and 208 are performed to satisfy certain test strategy exit criteria. Satisfaction of these exit criteria allows gate 114 to be closed so that the software development life cycle can proceed to design stage 104. In step 206 actions required in test strategy phase 124 are taken. These steps include generation of required deliverables and obtaining required sign-offs to meet the exit criteria of test strategy phase 124. In step 208, it is determined whether the exit criteria for test strategy phase 114 have been satisfied. If the exit criteria have not been satisfied, the process continues in step 206 by continuing to generate deliverables or obtain required sign-offs to meet the exit criteria. If the exit criteria have been satisfied, gate 114 is closed in step 210. Closure of gate 114 enables the software development life cycle to continue with design phase 104.

In an embodiment of the present invention, test strategy phase 124 exit criteria include generation of appropriate test strategy phase deliverables and obtaining appropriate QA sign-offs. For example, in an embodiment of the present invention, the test strategy phase 124 deliverables include a high-level test plan/strategy and a high-level automation plan strategy, a QA resource estimator and an estimate of testing effort sizing. The high-level test plan/strategy and the high-level automation plan are a testing process analysis and tool consideration documents. The QA resource estimator is an estimate of the resources that will be required for testing.

Resources include personnel, test apparatus, test facility and other testing resources. The testing effort sizing includes personnel and cost considerations. In addition, preferably, a QA lead must sign off on the baseline requirements document. The QA lead reviews the baseline requirements document to ensure that it meets established approval criteria.

Figure 2B:
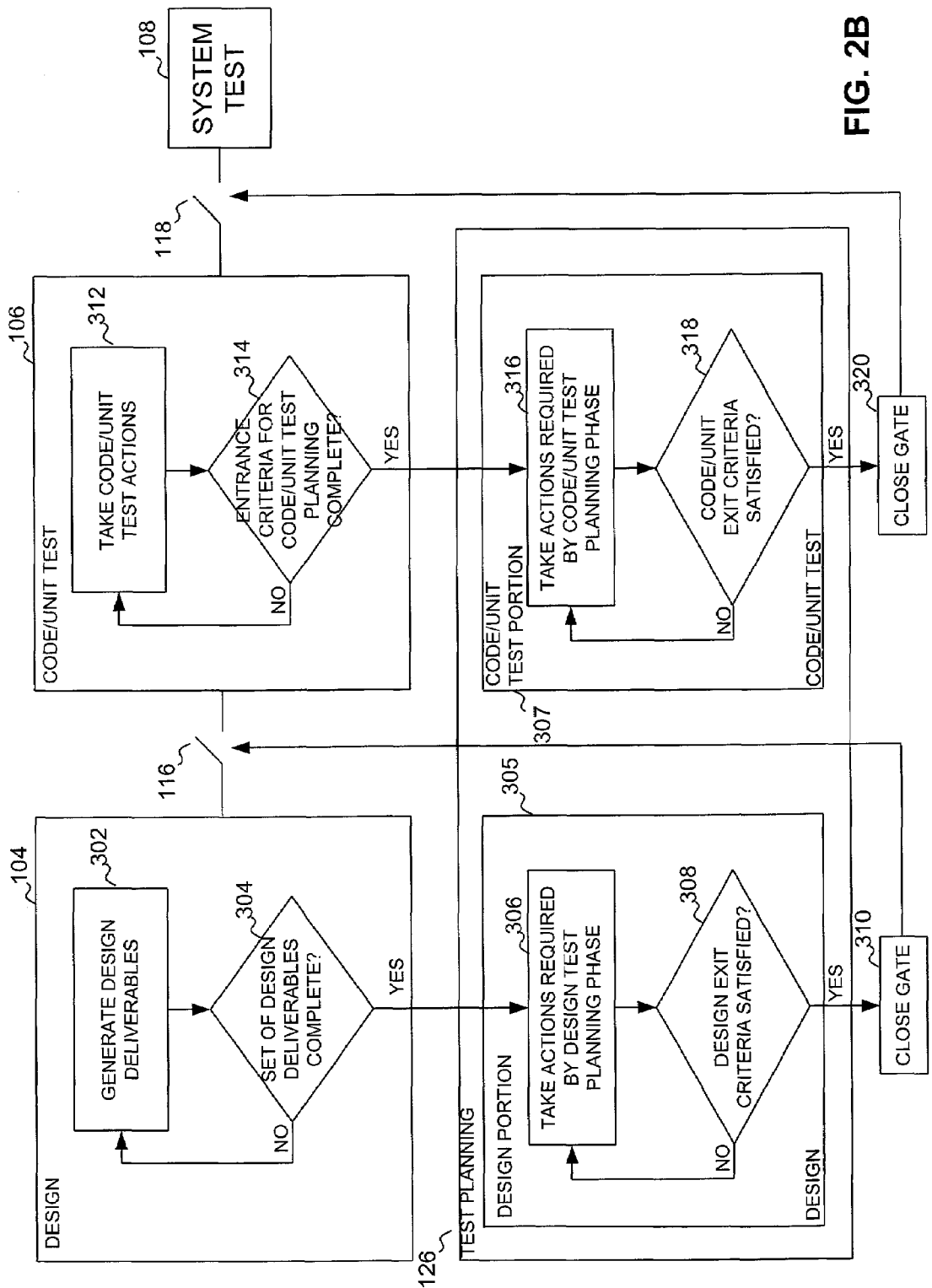
FIG. 2B is a flow chart for a method for generating entrance criteria and satisfying exit criteria to close a gate, permitting a another portion of the software development life cycle to proceed according to an embodiment of the present invention.

FIG. 2B is flowchart for a method for satisfying exit criteria for test planning phase 126 so that gate 116 can be closed to allow the software development life cycle to proceed from design phase 104 to code/unit test phase 106, and so that gate 118 can be closed to allow the software development life cycle to proceed from code/unit test phase 106 to system test phase 108 according to an embodiment of the present invention. As shown in FIG. 2B, test planning phase 126 of the QA life cycle corresponds to design phase 104 and code/unit test phase 106 of the software development life cycle.

Steps 302 and 304 are performed during design phase 104 to generate entrance criteria for a design portion 305 of QA life cycle test planning phase 126. In step 302, deliverables for design phase 104 are generated. Step 304 determines whether a complete set of design phase deliverables has been generated. If a complete set of design phase deliverables has not been generated, the method continues in step 302 with continued generation of design phase deliverables. If a complete set of design phase deliverables has been generated, the method proceeds in design portion 305 of test planning phase 126.

In a preferred embodiment of the present invention a complete set of deliverables for the design phase includes a design specification, use cases, object models, data flow diagrams, a site map or UID, and a change request process must be in place. The design specification is a detailed design specification. Use cases, object models and data flow diagrams are all constructs in the software application that are well-known to those having skill in the art. The site map or UID is a plan for the environment where the machines on which the software application will execute are to be housed. The change request process provides a formal feedback mechanism from customers to developers to report any problems or required changes to the software application.

In design portion 305, steps 306 and 308 are performed to satisfy certain exit criteria for design portion 305. Satisfaction of these exit criteria allows gate 116 to be closed so that the software development life cycle can proceed to code/unit test phase 106. In step 306 actions required for design portion 305 are taken. These steps include generation of appropriate deliverables and obtaining required sign-offs. In step 308, it is determined whether the exit criteria for design portion 305 have been satisfied. If the exit criteria have not been satisfied, the process continues in step 306. If the exit criteria have been satisfied, gate 116 is closed in step 310. Closure of gate 116 enables the software development life cycle to continue with code/unit test phase 106.

In an embodiment of the present invention, design portion 305 exit criteria include generation of appropriate design portion 305 deliverables and obtaining appropriate QA sign-offs. For example, the design portion 305 deliverables include a QA sign-off design document, a detailed test plan, a risk assessment, a contingency plan, a mitigation plan, a verified test platform, and test automation and design 60% complete. The QA sign-off design document is essentially a check list for design portion 305. The detailed test plan includes a detailed description of the planned test cases for the software application. The risk assessment is a description of the risk associated with performing or not performing various test cases. The contingency plan includes alternative tests to perform if one or more of the planned test cases cannot be performed or cannot be performed within the schedule that is allotted and budgeted. The mitigation plan includes a description of how to minimize the impact of not performing one or more planned test cases. The verified test platform is an identification of the machine on which the tests will be performed. The automation and design 60% complete includes any automation planning. Automation identifies any automatic testing tools, such as a test director, that are to be used. Any scripts that need to be developed for automatic testing tools are also identified.

Upon closure of gate 116, the process continues with code/unit test phase 106. Steps 312 and 314 are performed during code/unit test phase 106 to generate entrance criteria for a code/unit test portion 307 of QA life cycle test planning phase 126. In step 312, deliverables for code/unit test phase 106 are generated. Step 314 determines whether a complete set of design phase deliverables has been generated. If a complete set of design phase deliverables has not been generated, the method continues in step 312 with the continued generation of design phase deliverables. If a complete set of requirements deliverables has been generated, the method proceeds in code/unit test portion 307 of test planning phase 126.

In a preferred embodiment of the present invention, the entrance criteria for code/unit test portion 307 of the QA life cycle include that 90 percent of the complete version of controlled software has been generated and 80 percent of unit testing has been defined. Further, the entrance criteria further include a list of unit test scripts and unit test defects. Any release notes applicable to the testing phase at this point must be drafted and delivered. The entrance criteria also include user documentation such as a design document and a user manual. In addition, the entrance criteria include site documentation such as a site map and installation and conversion procedures delivered to satisfy the entrance criteria.

In one embodiment of the present invention, the entrance criteria for code/unit test portion 307 of the QA life cycle include generation of at least 90 percent of the complete version of controlled software and definition of at least 80 percent of the unit testing. Further, the entrance criteria include a list of unit/test scripts and unit test defects. Any release notes applicable to the testing phase at this point must be delivered. Further, version controlled user documentation, including a design document and user's manual must be delivered. In addition, site documentation such as a site map and installation and conversion procedures must be delivered.

In code/unit test portion 307, steps 316 and 318 are performed to satisfy certain exit criteria for design portion 307. Satisfaction of these exit criteria allows gate 118 to be closed so that the software development life cycle can proceed to system test phase 108. In step 316 actions required for code/unit test portion 307 are taken. These steps include generation of appropriate deliverables and obtaining required sign-offs. In step 318, it is determined whether the exit criteria for code/unit test portion 307 have been satisfied. If the exit criteria have not been satisfied the process continues in step 316. If the exit criteria have been satisfied, gate 118 is closed in step 320. Closure of gate 118 enables the software development life cycle to continue with system test phase 108.

In an embodiment of the present invention, the exit criteria required to close gate 118 include QA sign off of the unit test scripts. In addition, the delivered release notes and user manual must be reviewed and verified. Further, there must be at least 95 percent completion of the test test cases. Further, traceable test cases must be generated. Traceable test cases include, for example, test cases that are mapped to requirements and design documentation. Also, test automation planning and design must be completed prior to closure of gate 118.

Figure 2C:
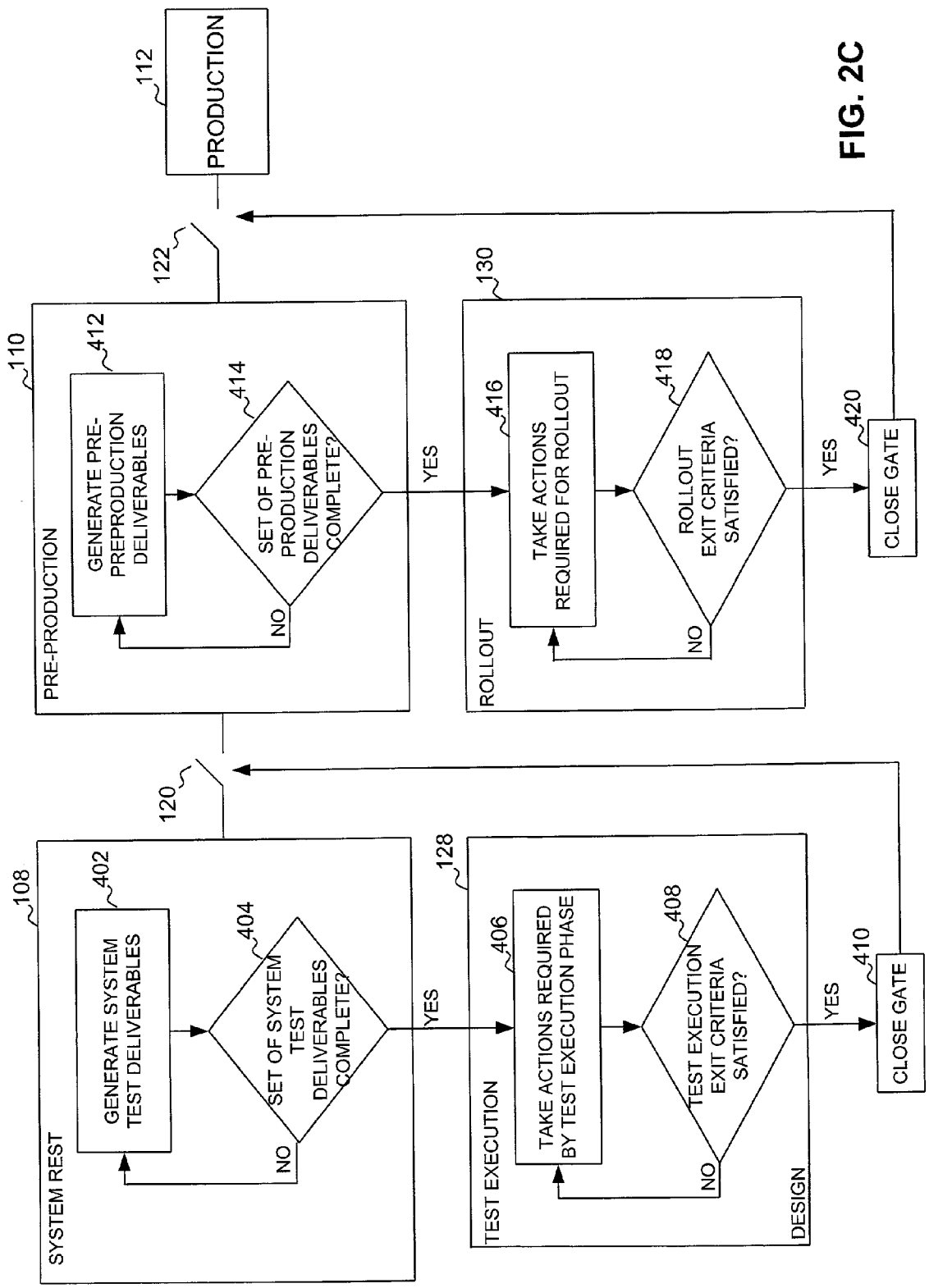
FIG. 2C is a flow chart for a method for generating entrance criteria and satisfying exit criteria to close a gate, permitting another portion of the software development life cycle to proceed according to an embodiment of the present invention.

FIG. 2C is flowchart for a method for satisfying exit criteria for test execution phase 128 so that gate 120 can be closed to allow the software development life cycle to proceed from system test phase 108 to pre-production phase 110. In addition, FIG. 2C shows the entrance criteria required from pre-production phase 110 to enter rollout phase 130 of the QA life cycle according to an embodiment of the present invention.

Steps 402 and 404 are performed during system test phase 108 to generate entrance criteria for test execution phase 128. In step 402, deliverables for system test phase 108 are generated. Step 404 determines whether a complete set of system test phase deliverables has been generated. If a complete set of system test phase deliverables has not been generated, the method continues in step 402 with generation of system test phase deliverables. If a complete set of system test phase deliverables has been generated, the method proceeds step 406 of test execution phase 128.

In a preferred embodiment of the present invention a complete set of deliverables for system test phase 108 includes definition of performance and platform requirements, identification of software change requests and test data hand-off.

In test execution phase 128, steps 406 and 408 are performed to satisfy certain exit criteria for test execution phase 128. Satisfaction of these exit criteria allows gate 120 to be closed so that the software development life cycle can proceed to pre-production phase 110. In step 406, actions required for test execution phase 128 are taken. In an embodiment of the present invention, these, steps include generation of appropriate deliverables and obtaining required sign-offs. In step 408, it is determined whether the exit criteria for test execution phase 128 have been satisfied. If the exit criteria have not been satisfied the process continues in step 406. If the exit criteria have been satisfied, gate 120 is closed in step 410. Closure of gate 120 enables the software development life cycle to continue with pre-production phase 110.

In an embodiment of the present invention, test execution phase 128 exit criteria include generation of appropriate test execution phase deliverables and obtaining appropriate QA sign-offs. For example, the test execution phase 128 deliverables include established system performance criteria such as load and stress testing. All QA tests must be completed, and, preferably, reviewed by the QA lead, the QA test team, the development lead and the prime integrator. Testing must identify and repair all serious errors. Workaround target dates must be identified for less severe errors. A defect log/report is prepared for all errors. All source code must be under change management, and any source code identified for review must have been reviewed or inspected.

Upon closure of gate 120, the process continues with pre-production phase 110. Steps 412 and 414 are performed during pre-production phase 110 to generate entrance criteria for rollout phase 130 of the QA life cycle. In step 412, deliverables for pre-production phase 110 are generated. Step 414 determines whether a complete set of pre-production phase deliverables has been generated. If a complete set of pre-production phase deliverables has not been generated, the method continues in step 412 with generation of pre-production phase deliverables. If a complete set of requirements deliverables has been generated, the method proceeds in rollout phase 130 of the QA life cycle.

In a preferred embodiment of the present invention, the entrance criteria for rollout phase 130 include 100 percent complete code such that code development can be frozen. Further, the documentation for the computer application being developed must be 100 percent complete. One hundred percent of the performance metrics must have been met and the configuration requirements must be 100 percent complete. In addition, 100 percent of the test cases must have been successfully completed.

In rollout phase 130, step 416 is performed to satisfy certain exit criteria for rollout phase 130. Satisfaction of these exit criteria allows gate 122 to be closed so that the software development life cycle can proceed to production phase 112. In step 416, actions required for rollout phase 130 are taken. These steps include generation of appropriate deliverables and obtaining required sign-offs. In step 418, it is determined whether the exit criteria for rollout phase 130 have been satisfied. If the exit criteria have not been satisfied the process continues in step 416. If the exit criteria have been satisfied, gate 418 is closed in step 420. Closure of gate 122 enables the software development life cycle to continue with production phase 112.

In an embodiment of the present invention, the exit criteria required to close gate 122 include QA go/nogo sign off and QA documentation sign-off. Management sign-off is also required at this point to enter production phase 112.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for performing rapid life cycle quality assurance during the production of a computer application product, comprising the steps of:

(a) partitioning a software development life cycle into a plurality of life cycle phases, wherein the plurality of life cycle phases includes a requirements phase, a design phase, a code test phase, a system test phase, a pre-production test phase, and a production phase;

(b) partitioning a quality assurance life cycle into a plurality of quality assurance phases that include a test strategy phase, a test planning phase, a test execution phase, and a rollout phase;

(c) assigning one or more of the life cycle phases to each quality assurance phase, wherein the test strategy phase is assigned to the requirements phase, the test planning phase is assigned to the design phase and to the code test phase, the test execution phase is assigned to the system test phase, and the rollout phase is assigned to the pre-production phase;

(d) determining one or more entrance criteria that must be completed during each life cycle phase so that the corresponding quality assurance phase can be entered, where the entrance criteria for the test strategy phase includes a completed requirements document and a completed high-level design document, wherein the entrance criteria for the test planning phase includes a design specification, a description of use cases, object models, a dataflow diagram, a site map, and a change request process description, wherein the entrance criteria for the test execution phase includes a definition of unit testing, a list of unit test scripts and unit test defects, a user manual, a definition of performance platform requirements, and an identification of software change requests and test data hand-off, and wherein the entrance criteria for the rollout phase includes a complete computer application source code recorded on a computer readable medium such that code development is frozen, complete application documentation, successful completion of all performance metrics, and successful completion of all test cases;

(e) determining one or more exit criteria requiring the production of at least one deliverable for each quality assurance phase that when satisfied allows the software development life cycle to proceed to the next life cycle phase, wherein the deliverable required by the test strategy phase includes a test plan and automation plan, a resource estimator, and an estimate of test effort size, the deliverable required by the test plan phase includes a test plan, a risk assessment of the test plan, a contingency plan for alternative tests, a mitigation plan for unusable tests, a verified test platform, quality assurance sign off of the test scripts and the user manual, traceable test cases, and completion of test automation plan and design, the deliverable required by the test execution phase includes established performance metrics for load and stress testing, an identification of serious errors and workaround target dates for less serious errors, and completion of source code review, and the deliverable required by the rollout phase prior to the entering the production phase comprises at least a quality assurance approval for the application documentation and quality assurance and management sign-off of the complete computer application source code recorded on the computer readable medium; and (f) performing each of the life cycle and quality assurance phases to produce the computer application source code recorded on the computer readable medium.

* * * * *